Figure 1:
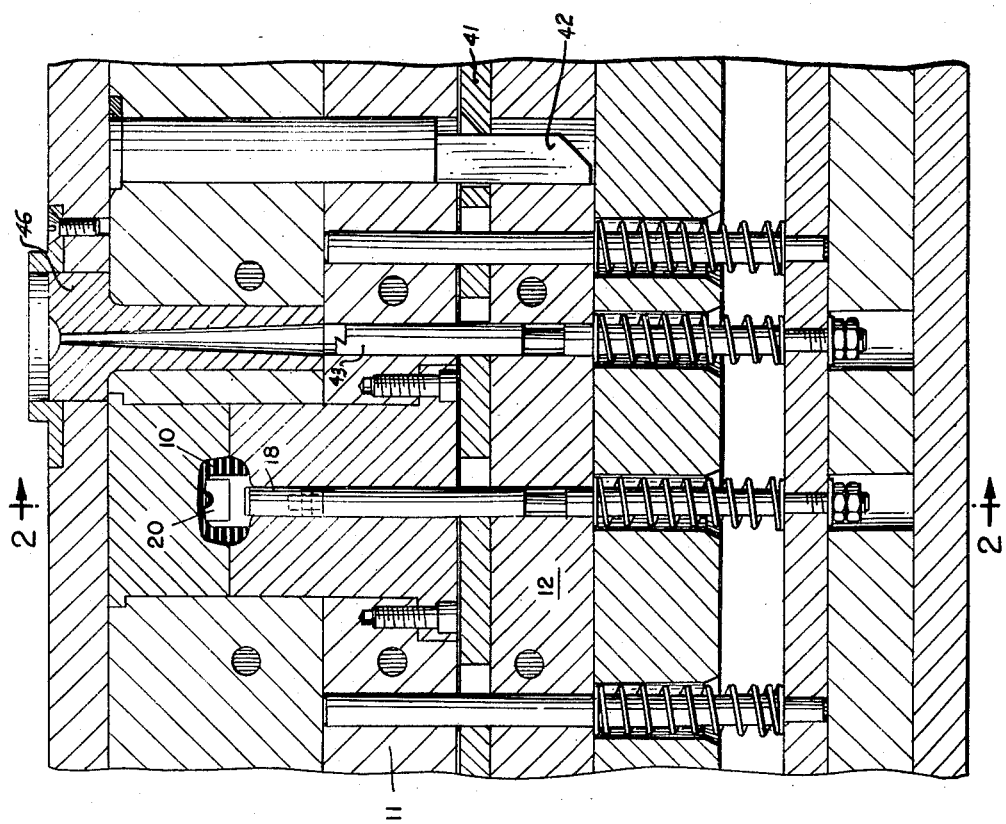

Nov. 18, 1958     W. C. GRAVES ET AL     2,860,376
APPARATUS FOR MOLDING TELEPHONE HANDSET HANDLES
Filed July 16, 1954     2 Sheets-Sheet 1

*INVENTORS:*
W. C. GRAVES
F. H. WALTI
BY C. B. Hamilton
ATTORNEY

Nov. 18, 1958 W. C. GRAVES ET AL 2,860,376
APPARATUS FOR MOLDING TELEPHONE HANDSET HANDLES
Filed July 16, 1954 2 Sheets-Sheet 2

INVENTORS:
W. C. GRAVES
F. H. WALTI
BY C. B. Hamilton
ATTORNEY 2,860,376

APPARATUS FOR MOLDING TELEPHONE HANDSET HANDLES

William C. Graves and Fred H. Walti, Indianapolis, Ind., assignors to Western Electric Company, Incorporated, New York, N. Y., a corporation of New York Application July 16, 1954, Serial No. 443,802

6 Claims. (Cl. 18—42)

This invention relates to molding apparatus, and more particularly to apparatus for molding plastic telephone handset handles.

In the manufacture of plastic telephone handset handles having angularly disposed transmitter and receiver end sockets connected by a passage to serve as a conductor conduit, the handles are normally molded by a mold having many removable cores and core-supporting means, which require manual effort and expense to assemble and remove from molded handles. Also, there must be a plurality of sets of these many elements which are movable from the mold to provide continuous operation of the mold.

An object of the invention is to provide new and improved molding apparatus.

Another object of the invention is to provide new and improved apparatus for molding plastic telephone handset handles.

Another object of the invention is to provide apparatus for injection-molding telephone handset handles.

A further object of the invention is to provide plastic telephone handle handset molding apparatus having a minimum of core elements.

A molding apparatus illustrating certain features of the invention may include a separable mold having an elongated molding cavity therein and a pair of angularly disposed cores mounted slidably on one mold part. The molds are movable relative to the cores to extract the cores from a molded part and then are separable to remove the molded part.

A molding apparatus forming a more specific embodiment of the invention may include a mold section having a handset handle molding cavity therein, a core support serving to close the cavity and a pair of ball cores having guideways therein and shanks mounted slidably in bores in the core support. A platen positioned on the side of the core support most remote from the mold section has guideways for receiving draw bolts fastened to the cores to permit the cores to move only laterally as the mold and the core support are moved away from the platen. A pair of passage-forming cores are designed to be supported in the guideways in the ball cores and to be removable therefrom as the ball cores are pulled from the mold cavity.

A complete understanding of the invention may be obtained from following detailed description of a molding apparatus forming a specific embodiment thereof, when read in conjunction with the appended drawings, in which—

Figure 2:
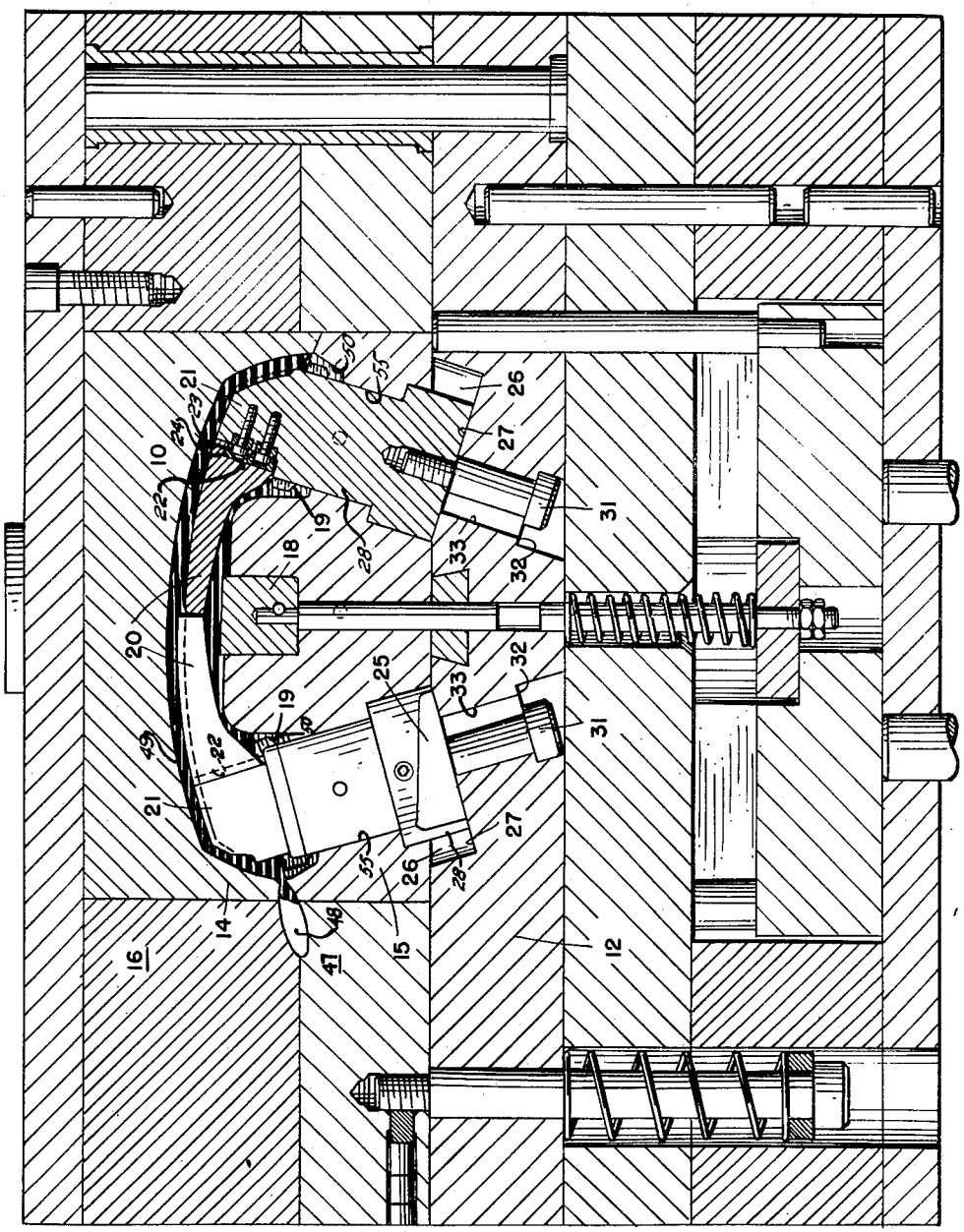

Fig. 1 is a vertical section of a molding apparatus forming one embodiment of the invention, and Fig. 2 is a vertical section taken along line 2—2 of Fig. 1.

Referring now in detail to the drawings, there is shown therein an apparatus for molding a hollow telephone handset handle 10 and is provided with an upper mold section 14 carried by a platen 16 and separable from a lower mold section 15 carried by a middle platen 11, which is separable from a lower platen 12. In opening the apparatus after a molding operation, the platens 11 and 16 are separated, first to separate mold sections 14 and 15 carried by the platens 16 and 11 to remove the molded handset handle from the mold section 15. Then the platens 11 and 12 are separated. A knockout bar 18 is provided for ejecting the molded handset handle 10 with thread forming rings 19 from the section 15. Passage-forming cores 20 extend through the handle and are slidably connected to socket-forming cores 21, which may be slid downwardly relatively to the cores 20 and are completely separable from the cores 20. The cores 20 are provided with dovetail grooves 22 slidable upwardly on dovetail guides 23 fastened to the cores 21. Tops 24 of the guides act as stops to limit the downward movement of the cores 20 relative to the cores 21. The cores 21 may be slid downwardly out of the cores 20.

Cylindrical shanks 28 of the cores 21 are provided with flat sides 25 slidable along guideways 26 formed in the lower platen 12, which guideways are provided with bottoms 27 perpendicular to the longitudinal axes of the cores 21 and are disposed angularly with respect to one another. Cap screws 31 slidable along guide surfaces 32, which are parallel to the bottoms 27, extend through slots 33 and hold the cores 21 against movement away from the bottoms 27 of the guideways 26 formed in the platen 12. Hence, as the platens 11 and 16 are moved with the molding sections 14 and 15 away from the lower platen 12, the cores 21 are pulled axially out of the molded article, the cores 21 being slid along the guideways 26 as they are so removed from the molding section 15. The slots 33 permit such sliding movement, and the cap screws 31 prevent longitudinal movement of the cores 21.

A suitably actuated latching bar 41 (Fig. 1) serves to keep the knockout bar 18 elevated after the mold sections 14 and 15 are opened, a release cam 42 permitting the bar 41 to be moved to its latching position when retracted from the bar 41 as the platens are opened. The bar 41 also serves to hold a notched sprue pulling pin 43 in an elevated position relative to the platen 11 when the platens are open and the bar 41 is in its latching position. A sprue bushing 46 designed to receive an injection nozzle (not shown) communicates with a runner 47 and a gate 48 to a mold cavity 49 in the mold sections 14 and 15. Sockets 50 formed in the mold section 15 receive the core rings 19 which fit closely and slidably over the shanks 28 of the cores 21 slidable in bores 55.

Operation

With the platens 11 and 16 open, the core rings 19 are placed in the sockets 50 and the cores 20 are fitted onto the cores 21. The platens then are closed to their molding positions as shown in Fig. 2. The injection nozzle (not shown) then forces a thermoplastic compound through the sprue bushing 46, the runner 47 and the gate 48 to the cavity 49 and fills the cavity. Then, after allowing the thermoplastic compound to harden, the platen 16 is moved completely away from the platen 11 and the handle 10. Then the platen 11 is moved away from the platen 12, and the cores 21 are pulled out of the molded handset handle 10. Since the cores 21 are disposed at angles to the direction of movement of the platen 11, the cores slide laterally of their longitudinal axes so that they do not bind in the bores 55. After the platen 11 has been moved away from the platen 12 sufficiently for the cores 21 to be completely withdrawn from the cores 20, the knockout bar 18 and the spure puller 43 are moved upwardly to push the handle 10 away from the mold section 15 out of the sockets 50 and the sprue on the puller 43 up away from the section 15, respectively. The handle with the rings 19 and the cores 20 then is removed from the apparatus, other rings and cores identical with the rings 19 and the cores 20 are placed in the apparatus after closing the platens 11 and 12, and the operation just described is repeated. The cores 20 may then be pulled out of the handle, being of such a shape as to come out of the holes left by the cores 21, and the rings 19 are removed.

The above-described apparatus rapidly molds handset handles with a minimum of effort, and requires only the four core elements 19 and 20 to be placed in the apparatus for each operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for molding telephone handset handles having angularly disposed sockets connected by a passage, which comprises an upper mold section having a cavity for molding the upper and side exterior portions of such a handle with the bottom portion of the cavity open, a lower mold section for closing the cavity and forming the under exterior portions of the handle, said lower mold section having angularly disposed sockets in the upper portion thereof facing the end portions of the cavity in the upper mold section and also being provided with bores aligned with the sockets and extending from the bottom of the lower mold section to the bottoms of the sockets, a pair of socket-forming cores having shanks slidable in the bores and ball portions having guideways in the sides thereof designed to project into the cavity, a pair of thread-forming rings designed to fit slidably over the cores and seat in the sockets in the lower mold section, a pair of tapered passage-forming cores designed to fit interlockably in the guideways in the socket-forming cores and be supported thereby, a lower platen having a guideway keying the shanks against rotation and permitting transverse movement thereof, and means for holding the cores against longitudinal movement relative to the platen.

2. An apparatus for molding telephone handset handles having angularly disposed sockets connected by a passage, which comprises a first mold section having an open cavity for molding the upper and side exterior portions of such a handle, a second mold section for closing the cavity and forming the under exterior portions of the handle, said second mold section having angularly disposed sockets facing the end portions of the cavity in the mold section and also being provided with bores aligned with the sockets and extending therethrough from the bottoms of the sockets, a pair of socket-forming cores having shanks slidable in the bores and ball portions having guideways in the sides thereof designed to project into the cavity, a pair of tapered passage-forming cores designed to fit interlockably in the guideways in the socket-forming cores and be supported thereby, a platen having a guideway permitting transverse movement of the socket-forming cores, and means for holding the cores against longitudinal movement relative to the platen.

3. An apparatus for molding telephone handset handles having angularly disposed sockets connected by a passage, which comprises an upper mold section having a cavity for molding the upper exterior portions of such a handle with the bottom portion of the cavity open, a lower mold section for closing the cavity and forming the under side of the handle, said lower mold section having angularly disposed sockets in the upper portion thereof facing the end portions of the cavity in the upper mold section and bores aligned with the sockets and extending from the bottom of the lower mold section to the bottoms of the sockets, a pair of socket-forming cores having shanks slidable in the bores and ball portions having guideways in the sides thereof designed to project into the cavity, a pair of passage-forming cores slidably mounted in said guideway and projecting toward each other, a lower platen having a guideway permitting transverse movement of the cores, and means for holding the cores against longitudinal movement relative to the platen.

4. A molding apparatus, which comprises a platen having angularly extending slots therethrough and guideways extending transversely of the slots, a pair of elongated socket-forming cores seated at one end of each in the guideways for transverse sliding movement along the guideways, draw means connected to the cores and extending through the slots for permitting transverse movement of the cores and preventing longitudinal movement of the cores, a first mold section movably mounted on the platen having angularly disposed bores through which the cores extend and project from, and a second mold section movably mounted on the first mold section having a mold cavity for receiving the projecting portions of the cores, said platen and said first mold section being movable apart to pull the socket-forming cores from an article molded by the cavity.

5. A molding apparatus, which comprises a bottom platen having angularly extending slots therethrough and guideways extending transversely of the slots, a pair of elongated socket-forming cores seated at one end of each in the guideways for transverse sliding movement along the guideways and keying the cores to the platen, bolt means connected to the cores and extending through the slots for permitting transverse movement of the cores and preventing longitudinal movement of the cores, a bottom mold section movably mounted on the platen having angularly disposed bores through which the cores extend and project from, and a top mold section movably mounted on the bottom mold section having a mold cavity for receiving the projecting portions of the cores, said platen and said bottom mold section being movable apart to pull the socket-forming cores from an article molded by the cavity.

6. A molding apparatus, which comprises a platen having angularly extending slots therethrough and guideways extending transversely of the slots, a pair of elongated socket-forming cores seated at one end of each in the guideways for transverse sliding movement along the guideways, a pair of bolt means connected to the cores and extending through the slots for permitting transverse movement of the cores and preventing longitudinal movement of the cores, a first mold section having angularly disposed bores through which the cores extend and project from, a second mold section having a mold cavity for receiving the projecting portions of the cores, and a pair of tapered passage-forming cores slidably supported on the sides of the socket-forming cores, said platen and said first mold section being movable apart to pull the socket-forming cores from the passage-forming cores and from an article molded by the cavity.

References Cited in the file of this patent

UNITED STATES PATENTS

| | | |
|---|---|---|
| 2,262,053 | Schultz | Nov. 11, 1941 |
| 2,293,633 | Shaw | Aug. 18, 1942 |
| 2,366,475 | Bartholomew | Jan. 2, 1945 |
| 2,436,065 | Dewey | Feb. 17, 1948 |